United States Patent
Shi et al.

(10) Patent No.: US 7,164,794 B2
(45) Date of Patent: Jan. 16, 2007

(54) UNCONSTRAINED HANDWRITING RECOGNITION

(75) Inventors: Bingxue Shi, Beijing (CN); Guoxing Li, Beijing (CN)

(73) Assignee: Winbond Electronics Corp., Hsinchu (TW)

(*) Notice: Subject to any disclaimer, the term of this patent is extended or adjusted under 35 U.S.C. 154(b) by 799 days.

(21) Appl. No.: 10/225,198

(22) Filed: Aug. 22, 2002

(65) Prior Publication Data
US 2004/0037464 A1 Feb. 26, 2004

(51) Int. Cl.
G06K 9/46 (2006.01)

(52) U.S. Cl. .............. 382/190; 382/156; 382/224; 706/20

(58) Field of Classification Search .......... 382/112, 382/156, 190, 224, 232, 159; 706/16, 20
See application file for complete search history.

(56) References Cited

U.S. PATENT DOCUMENTS

| | | | | |
|---|---|---|---|---|
| 5,497,430 A | * | 3/1996 | Sadovnik et al. | 382/156 |
| 5,577,135 A | * | 11/1996 | Grajski et al. | 382/253 |
| 5,832,183 A | * | 11/1998 | Shinohara et al. | 706/20 |
| 6,275,611 B1 | * | 8/2001 | Parthasarathy | 382/187 |
| 6,363,162 B1 | * | 3/2002 | Moed et al. | 382/112 |
| 6,574,613 B1 | * | 6/2003 | Moreno-Barragan | 706/16 |
| 6,650,779 B1 | * | 11/2003 | Vachtesvanos et al. | 382/228 |
| 7,020,334 B1 | * | 3/2006 | Li et al. | 382/194 |
| 2004/0037464 A1 | * | 2/2004 | Shi et al. | 382/190 |

FOREIGN PATENT DOCUMENTS

EP 896295 A2 * 2/1999

OTHER PUBLICATIONS

IEEE Transactions on Circuits and Systems, "CNN Cloning Template: Connected Component Detector," Matsumoto et al., vol. 37, No. 5, pp. 633-635, May 1990.

* cited by examiner

Primary Examiner—Gregory Desire
(74) Attorney, Agent, or Firm—Finnegan, Henderson, Farabow, Garrett & Dunner, L.L.P.

(57) ABSTRACT

Methods and systems of the present invention may be used to recognize digital image data arranged in rows and columns. Exemplary embodiments may include a feature extractor for extracting feature information from data representing the rows and columns of the digital image data, a feature compressor for compressing the extracted feature information, and a neural network for classifying the digital image data from the compressed, extracted feature information.

11 Claims, 16 Drawing Sheets

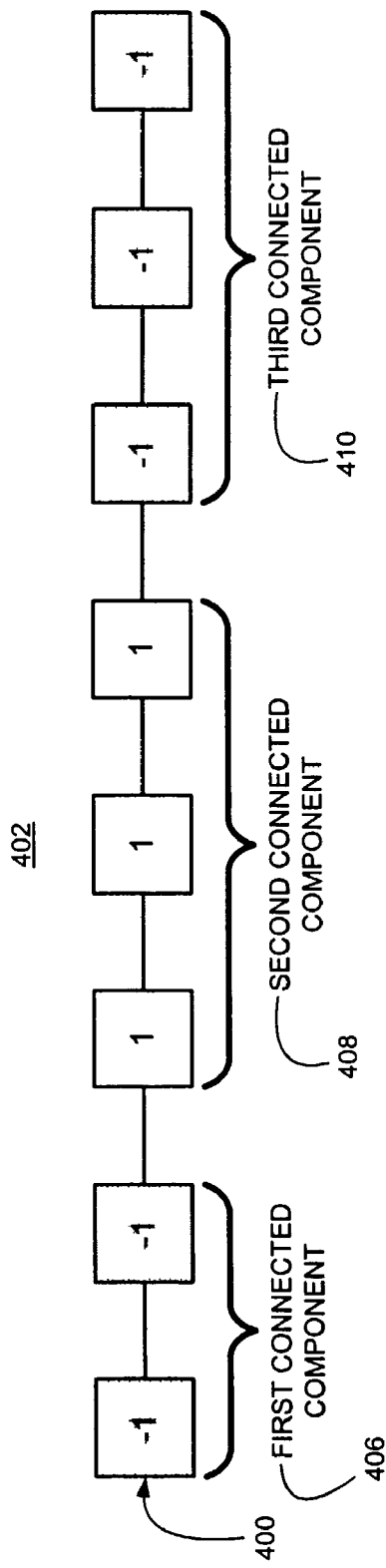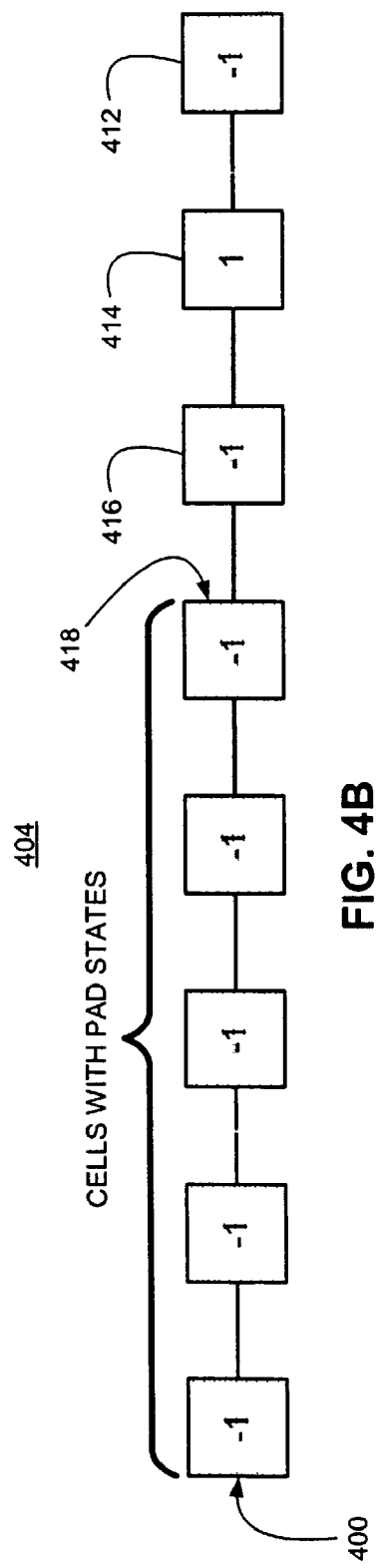

UNCONSTRAINED HANDWRITING RECOGNITION

DESCRIPTION

1. Technical Field

The present invention relates to methods, combinations, apparatus, systems, and articles of manufacture involving handwritten symbol recognition. In one example, handwritten symbol recognition may involve a Very Large Scale Integrated (VLSI) circuit.

2. Background

Computer handwritten symbol recognition has been a subject of intense research for many years. One goal of this research is to provide unconstrained recognition of handwriting, whereby handwritten symbols written by any individual may be recognized. In contrast, a constrained recognition system only recognizes symbols written by particular individuals because this type of system needs to learn the handwriting styles of the individuals. Thus, unconstrained recognition is more flexible and may be preferred over constrained recognition.

Many approaches have been proposed and tested for unconstrained recognition. Some of these approaches use artificial neural networks and fuzzy logic because they have the ability to learn and do not require precise mathematical models. However, most of these approaches are realized with software in Von Neumann computers, so the inherent parallel computing mechanism in artificial neural networks and fuzzy logic may not be realized. Furthermore, software approaches in Von Neumann computers are often unsuitable for compact or portable applications. Therefore, it would be beneficial to use a non-software approach that fully embodies the computing mechanism of an artificial intelligence for unconstrained handwritten symbol recognition.

One method of unconstrained recognition that may benefit from a non-software approach may use a cellular neural network (CNN). The CNN may extract features, such as connected components, in a digital image of a handwritten symbol to classify the symbol. A CNN generally includes a plurality of cells, wherein each cell is only coupled to its neighbor cell. The neighbor cells can directly interact with each other and cells not directly coupled together may only affect each other indirectly. FIG. 1 illustrates an exemplary two-dimensional CNN 100.

Every cell 102 of CNN 100 may be influenced by a limited number of cells in its environment. For example, a cell 104 may be connected to nearest neighbor cells 106 (gray cells). Nearest neighbor cells 106 and cell 104 may form a neighborhood 108 of cells. Neighborhood 108 may be called a "3-by-3 neighborhood." Similarly, a 5-by-5 neighborhood, a 7-by-7 neighborhood, and additional neighborhoods may also be defined.

CNN 100 exemplifies a two-dimensional CNN, but CNNs may also be one-dimensional, as illustrated by an exemplary CNN 200 in FIG. 2. Similar to CNN 100 in FIG. 1, every cell 202 in CNN 200 may be influenced by a limited number of cells in its neighborhood. For example, a cell 204 may be connected to nearest neighbor 206 (gray cells). Nearest neighbor cells 206 and cell 204 may form a neighborhood 208 of cells. Neighborhood 208 may be called a "1-by-3 neighborhood." Additional neighborhoods may also be defined.

Each of cells 202 may have a "state". Further, cells 202 may be configured to detect connected components with the same state. A connected component may be a contiguous block of cell(s) with the same state. For example, if cells 202 have one of only two possible states (i.e., binary states +1 or −1), then a contiguous block of cells with state +1 would be a connected component and a contiguous block of cells with state −1 would be another connected component. A connected component may consist of only one cell. FIGS. 3A–3C illustrates some exemplary connected components in a one-dimensional CNN.

Some methods for detecting connected components may configure the cells in a CNN to produce a characteristic final state given an initial state of the cells. The final state may then be interpreted to determine the number of connected components in the initial state. For example, FIGS. 4A to 4D illustrate exemplary initial states 402 and 452 and final states 404 and 454 of CNNs 400 and 450.

In FIG. 4A, initial state 402 of CNN 400 may include a first connected component 406, a second connected component 408, and a third connected component 410. CNN 400 may be configured to detect the number of connected components by producing final state 404. In FIG. 4B, the final state of a cell 412 may reflect the initial state of cells in connected component 410; the final state of a cell 414 may reflect the initial state of cells in connected component 408; and the final state of cell 416 may reflect the initial state of cells in connected component 406. Cells 418 to the left of cell 416 may have pad states (i.e., they may have the same final state as cell 416).

With respect to FIG. 4C, initial state 452 of CNN 450 may include a first connected component 456, a second connected component 458, a third connected component 460, a fourth connected component 462, and a fifth connected component 464. In FIG. 4D, the final state of a cell 466 may reflect the initial state of cells in connected component 464; the final state of a cell 468 may reflect the initial state of cells in connected component 462; the final state of a cell 470 may reflect the initial state of cells in connected component 460; the final state of a cell 472 may reflect the initial state of cells in connected component 458; and the final state of a cell 474 may reflect the initial state of cells in connected component 456. Cells 476 to the left of cell 474 may have pad states (i.e., they may have the same final state as cell 474).

From final states 404 and 454 of CNNs 400 and 450, one may determine which cells have pad states by searching for a contiguous group of cells with the same final state on the left side of CNNs 400 and 450. The number of remaining cells for CNNs 400 and 450 with alternating states at final states 404 and 454 may equal the number of connected components at initial states 402 and 452, respectively. In the above example, at final state 404, CNN 400 may have three cells (i.e., cells 412–416) with alternating states to indicate three connected components at initial state 402. Likewise, at final state 454, CNN 450 may have five cells (i.e., cells 466–474) with alternating states to indicate five connected components at initial state 452.

A CNN may be configured many ways to detect connected components (or perform other tasks). With respect to FIG. 1, any cell C(i,j) at the $i^{th}$ row and $j^{th}$ column of CNN 100 may contain linear and non-linear circuit elements, which may typically include linear capacitors, linear resistors, linear and non-linear controlled sources, and independent sources. Each of cells 102 in CNN 100 may have the same circuit structure and element values. An exemplary model circuit 500 of a single cell is shown in FIG. 5.

Each cell C(i,j) may contain an independent voltage source $E_{uij}$ 502 with an input voltage $u_{ij}$ 504, an independent current source I 506 (i.e., bias current), a capacitance C 508, a resistance R 510, a plurality of n voltage-controlled current sources $1_n^{ykl}$ 512 with a state voltage $x_{ij}$ 520, a plurality of n voltage-controlled current sources $1_n^{ukl}$ 514 with state voltage $x_{ij}$ 520, a voltage-controlled voltage source $E_{yij}$ 516 with an output voltage $y_{ij}$ 518, and a non-linear component 522. Controlled current sources $1_n^{ukl}$ 514 may be respectively coupled to n neighbor cells C(k, l) via input voltage $u_{kl}$ 504 of each neighbor cell C(k, l), where C(k, l) is a cell at the $k^{th}$ row and $l^{th}$ column of CNN 100. Neighbor cells C(k, l) may include all cells in a neighborhood of cell C(i,j). Similarly, controlled current sources $1_n^{ykl}$ 512 may be coupled to n neighbor cells C(k, l) via the feedback from output voltage $y_{kl}$ 518 of each neighbor cell C(k, l).

A cell C(i,j) may have direct connections to its neighbor cells C(k, l) through two kinds of weights: feedback weights a(k, l; i, j) and control weights b(k, l; i, J). The index pair (k, l; i, j) represents a direction of signal from C(k, l) to C(i,j). The weights a(k, l; i, j) and b(k, l; i, j) represent multiplicative coefficients (i.e., gains, reductions, or unity) on signals coming from a neighbor cell C(k, l) to cell C(i,j). Coefficients for weights a(k, l; i, j) may be arranged in a feedback-template (i.e., template A). Coefficients for weights b(k, l; i, j) may be arranged in a control-template (i.e., template B). Template A and template B may be the same for all cells 102 in CNN 100. The global behavior of CNN 100 may be characterized by a Template Set containing template A, template B, and bias current l 506. By way of a non-limiting example, if a 3-by-3 neighborhood is assumed, the Template Set may include nineteen coefficients (i.e., nine from template A, nine from template B, and one from bias current l).

The external input (e.g., $y_{kl}$ 518 and $u_{kl}$ 504 from neighbor cells C(k, l) to a cell C(i,j) may be assumed to be constant over a given operation interval. Therefore, the total input current to the cell C(i,j) may be given by the weighted sum of control inputs $u_{kl}$ 504 and weighted sum of feedback outputs $y_{kl}$ 518. In addition, a constant bias current l 506 term may be added. Due to capacitance C 508 and resistance R 510, state voltage $x_{ij}$ 520 for a cell C(i,j) may satisfy the differential equation, $$C\frac{dx_{ij}}{dt} = -\frac{1}{R}x_{ij} + \sum_{C(k,l)\in N_{ij}} I^{ykl} + \sum_{C(k,l)\in N_{ij}} I^{ukl} + I \qquad (1)$$

$$= -\frac{1}{R}x_{ij} + \sum_{C(k,l)\in N_{ij}} a(k, l; i, j)y_{kl} + \sum_{C(k,l)\in N_{ij}} b(k, l; i, j)u_{kl} + I,$$

where $N_{ij}$ is the set of cells within a neighborhood of cell C(i,j). State voltage $x_{ij}$ 520 may reflect a "state", as previously described, of cell C(i,j). By way of a non-limiting example, a positive or zero state voltage $x_{ij}$ 520 may reflect one binary state and a negative state voltage 520 may reflect another binary state.

State voltage $x_{ij}$ 520 and output voltage $y_{ij}$ 518 may be subject to a transfer function of non-linear component 522. The transfer function T(.) may be $$T(x_{ij}) = \frac{g}{2}(|x_{ij}+1| - |x_{ij}-1|) = y_{ij}, \qquad (2)$$

where g may be a gain factor.

FIG. 6 illustrates an exemplary block diagram 600 of the differential equation, wherein the templates A and B reflect a 3-by-3 neighborhood and only cells within the 3-by-3 neighborhood of a given cell may directly affect the given cell.

CNNs may be designed to behave in a desired manner by configuring their Template Sets. As one of ordinary skill in the art will appreciate, template A and template B for a one-dimensional CNN may be vectors instead of matrices for a two-dimensional CNN. A one-dimensional CNN may be configured to detect connected components by setting its template A to [1 2 −1] and its template B and current l to zero, as described by Matsumoto, T., Chua, L. O., and Suzuki, H., "CNN Cloning Template: Connected Component Detector", IEEE Transactions on Circuits and Systems, Vol. 37, No. 5, pp. 633–635, May 1990. The detected, connected component(s) may then be used as features to classify the handwritten symbol.

The foregoing description provides an explanation of an exemplary method for configuring a CNN to detect connected components. However, as one of ordinary skill in the art will appreciate, other methods for configuring a CNN may be used to detect connected components and/or extract features.

SUMMARY

Methods, combinations, apparatus, systems, and articles of manufacture consistent with the features and principles of the present invention may recognize handwritten symbols.

One exemplary aspect of the present invention may relate to a system for recognizing digital image data arranged in rows and columns. The system may comprise a feature extractor for extracting feature information from data representing the rows and columns of the digital image data, a feature compressor for compressing the extracted feature information, and a neural network for classifying the digital image data from the compressed, extracted feature information. The extracted feature information of a row may comprise a plurality of row bits and the extracted feature information of a column may comprise a plurality of column bits. A portion of the row bits from the extracted feature information of the rows may be removed and a portion of the column bits from the extracted feature information of the columns may be removed.

Another exemplary aspect of the present invention may relate to an integrated circuit. The circuit may comprise a connected component detection array for extracting feature information from data reflecting a digital image of handwritten information, a feature compressor for compressing the extracted information, and a neural network for classifying the handwritten information from the compressed information. The neural network may comprise a plurality of neural processing units for processing the compressed information, an integrator for storing intermediate results from the plurality of neural processing units, and means for applying transfer functions in the plurality of neural processing units.

Another exemplary aspect of the present invention may relate to another method for recognizing digital image data arranged in rows and columns. The method may comprise receiving a handwritten symbol, and processing the handwritten symbol. The handwritten symbol may be processed by extracting feature information from data representing the rows and columns of the digital image data, compressing the extracted feature information, and classifying the digital image data from the compressed, extracted feature information. The extracted feature information of a row may comprise a plurality of row bits and the extracted feature information of a column may comprise a plurality of column bits. A portion of the row bits from the extracted feature information of the rows may be removed and a portion of the column bits from the extracted feature information of the columns may be removed.

Another exemplary aspect of the present invention may relate to computer-readable medium containing instructions to cause a computer to execute the steps of receiving a handwritten symbol, and processing the handwritten symbol. The handwritten symbol may be processed by extracting feature information from data representing the rows and columns of the digital image data, compressing the extracted feature information, and classifying the digital image data from the compressed, extracted feature information. The extracted feature information of a row may comprise a plurality of row bits and the extracted feature information of a column may comprise a plurality of column bits. A portion of the row bits from the extracted feature information of the rows may be removed and a portion of the column bits from the extracted feature information of the columns may be removed.

Another exemplary aspect of the present invention may relate to a method for recognizing handwritten symbols. The method may comprise receiving a handwritten symbol, and processing the handwritten symbol using an integrated circuit. The integrated circuit may comprise a connected component detection array for extracting feature information from data reflecting a digital image of the handwritten symbol, a feature compressor for compressing the extracted information, and a neural network for classifying the handwritten symbol from the compressed information. The neural network may include a plurality of neural processing units for processing the compressed information, a storage medium for storing intermediate results from the plurality of neural processing units, and means for applying transfer functions in the plurality of neural processing units.

Additional aspects of the invention are set forth in the description which follow, and in part are apparent from the description, or may be learned by practice of methods, combinations, apparatus, systems, and articles of manufacture consistent with features of the present invention. It is understood that both the foregoing description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain principles of the invention. In the drawings.

FIGS. 4A–4B illustrate exemplary initial and final states of an exemplary CNN consistent with features and principles of the present invention;

DESCRIPTION OF EXEMPLARY EMBODIMENTS

Reference is now made in detail to embodiments consistent with the invention, examples of which are illustrated in the accompanying drawings. Wherever possible, the same reference numbers are used throughout the drawings to refer to the same or like parts.

Figure 1:
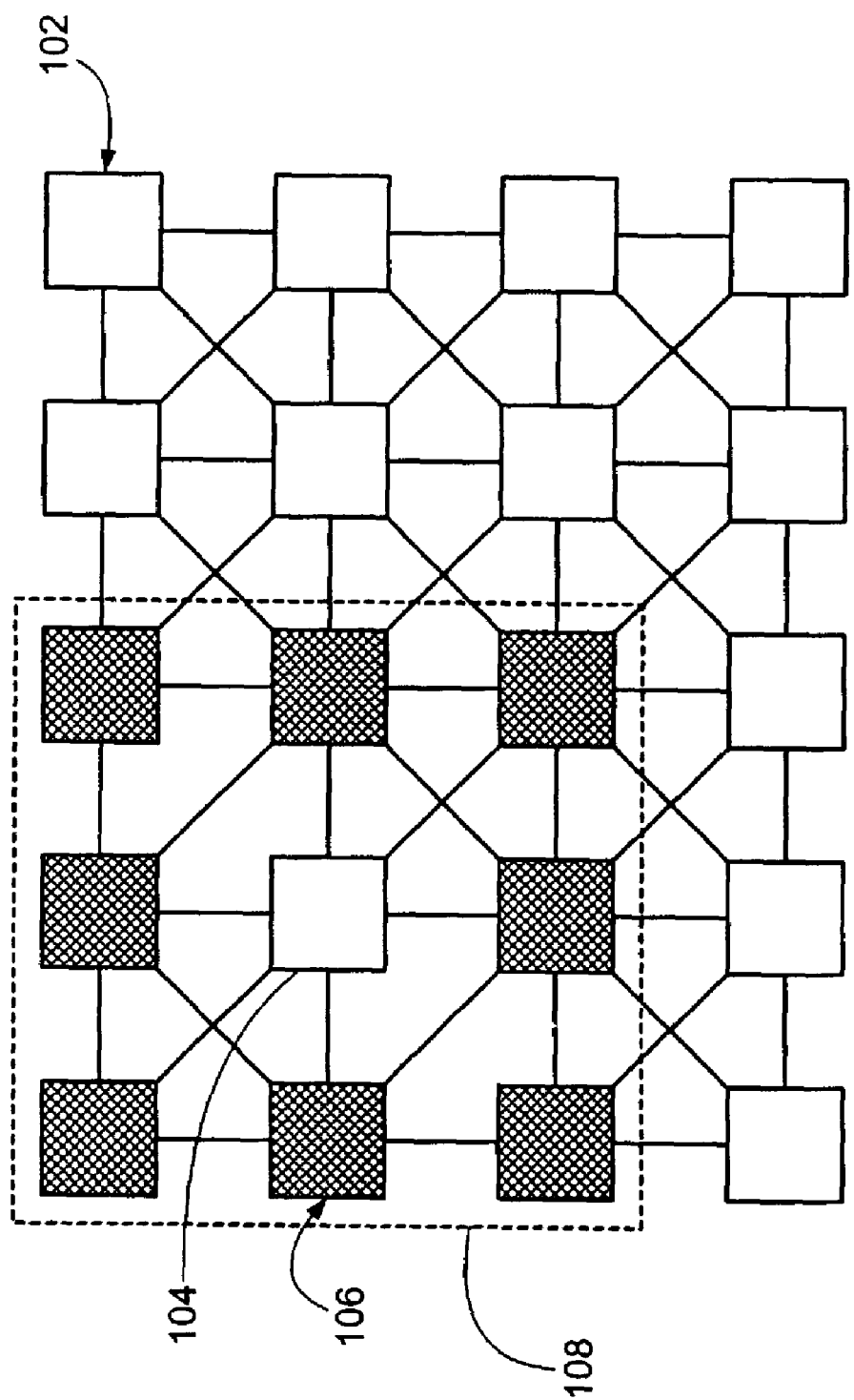
FIG. 1 illustrates an exemplary two-dimensional CNN consistent with features and principles of the present invention.
Figure 2:
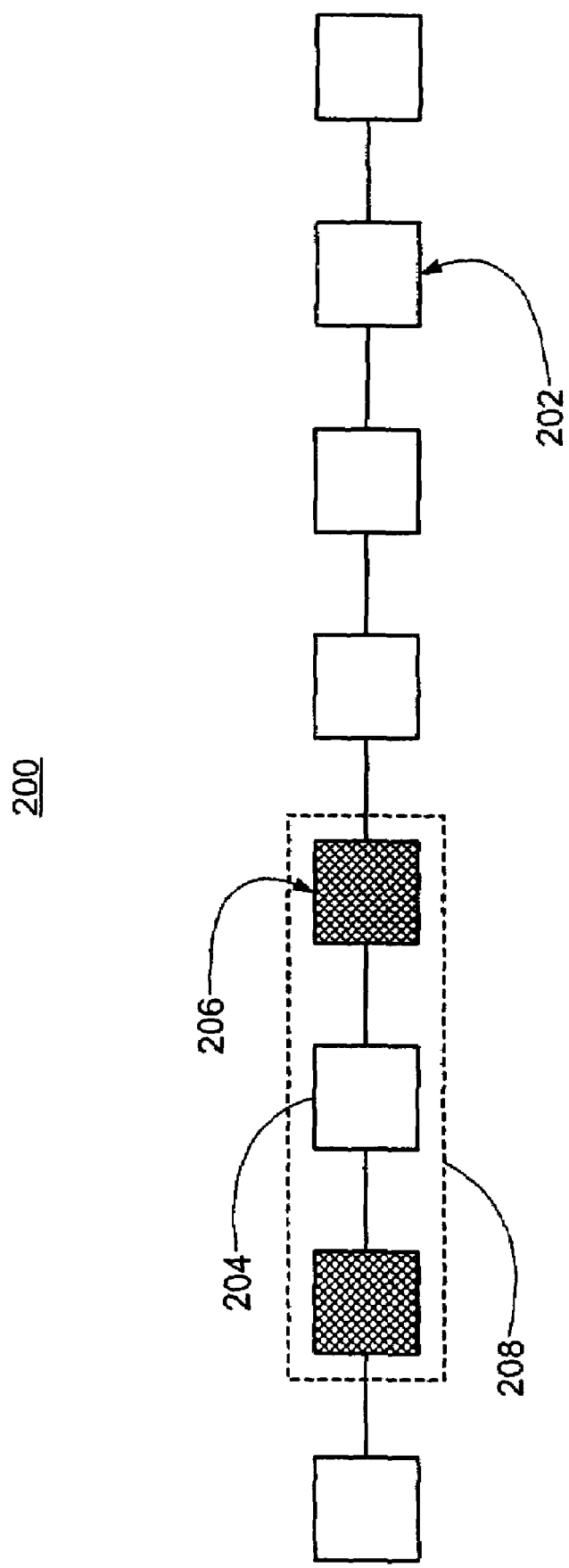
FIG. 2 illustrates an exemplary one-dimensional CNN consistent with features and principles of the present invention.
Figure 3A:
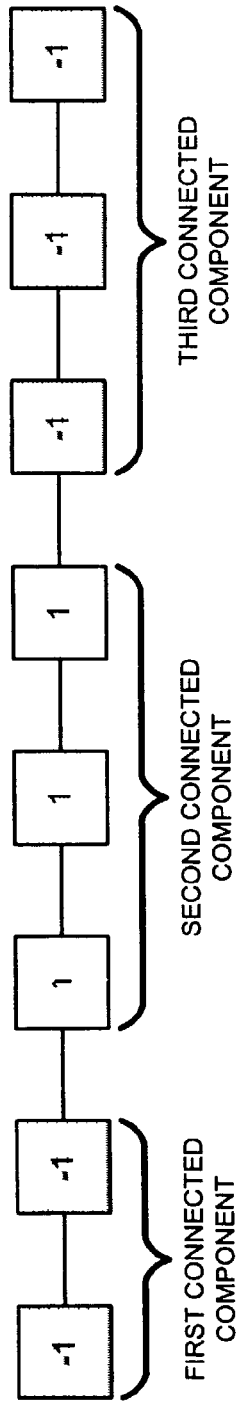
FIGS. 3A–3C illustrate exemplary connected components in a one-dimensional CNN consistent with features and principles of the present invention.
Figure 3B:
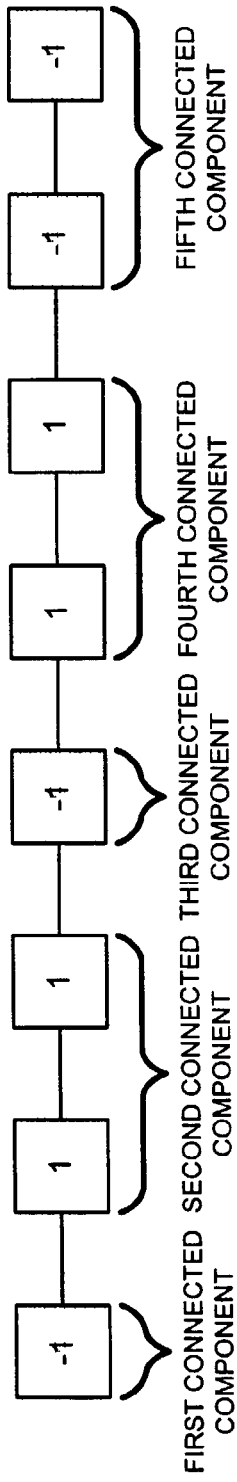
Figure 3C:
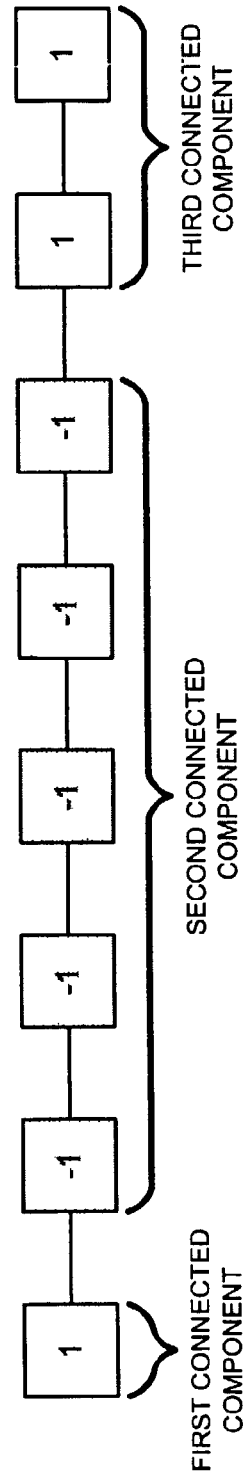
Figure 4C:
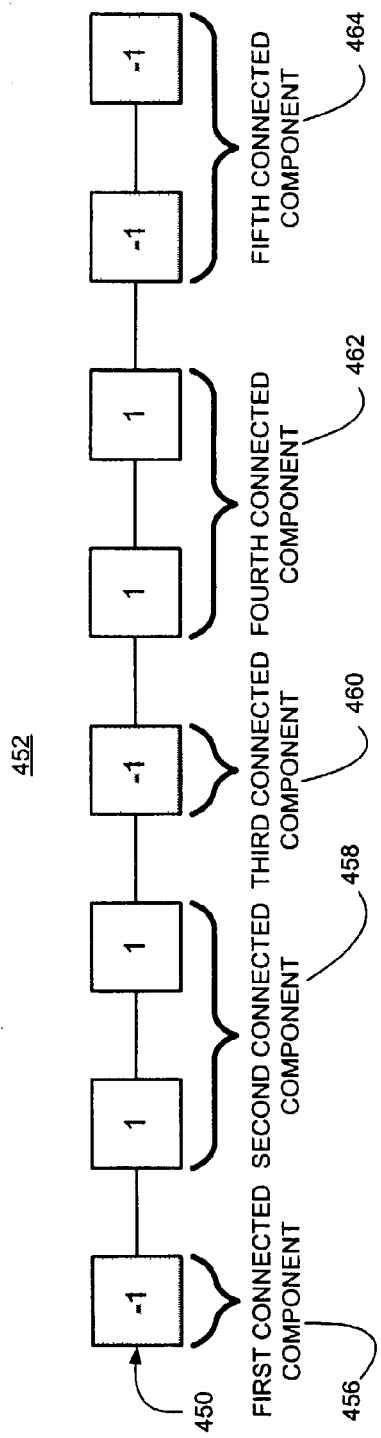
FIGS. 4C–4D illustrate exemplary initial and final states of another exemplary CNN consistent with features and principles of the present invention.
Figure 4D:
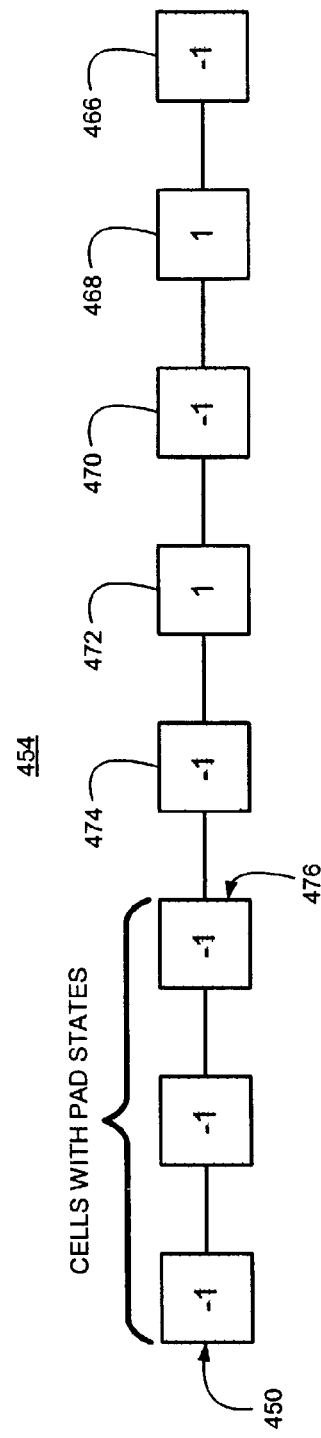
Figure 5:
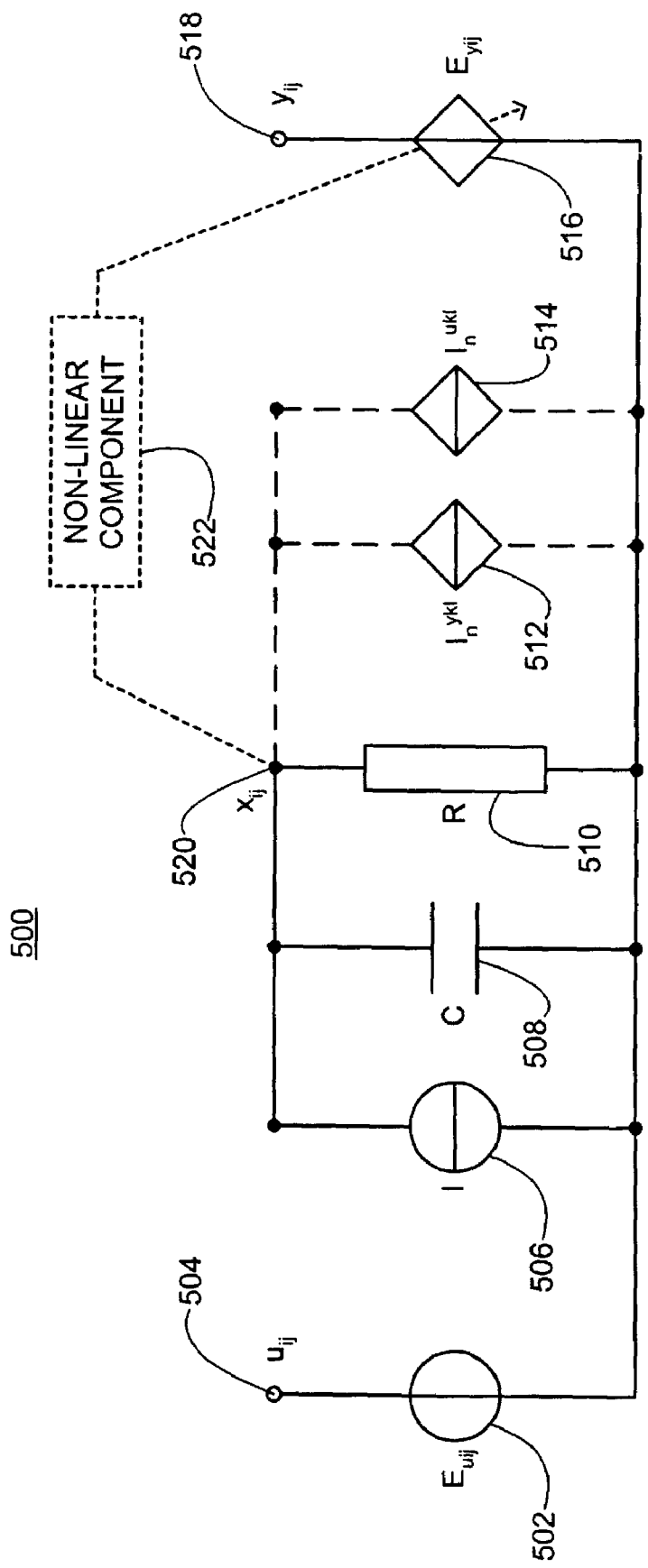
FIG. 5 illustrates an exemplary model circuit of a single cell in a CNN consistent with features and principles of the present invention.
Figure 6:
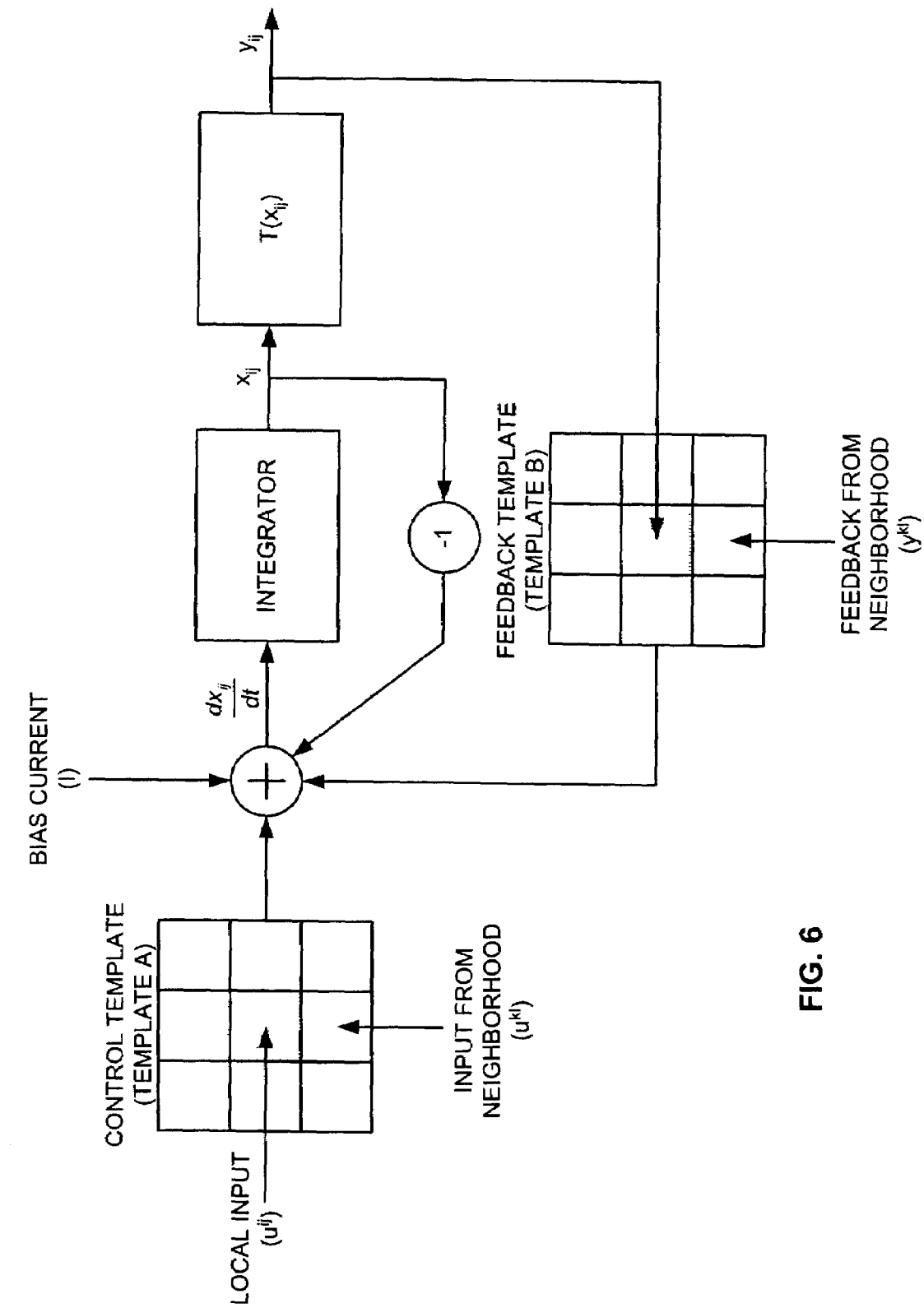
FIG. 6 illustrates an exemplary block diagram of a differential equation consistent with features and principles of the present invention.
Figure 7:
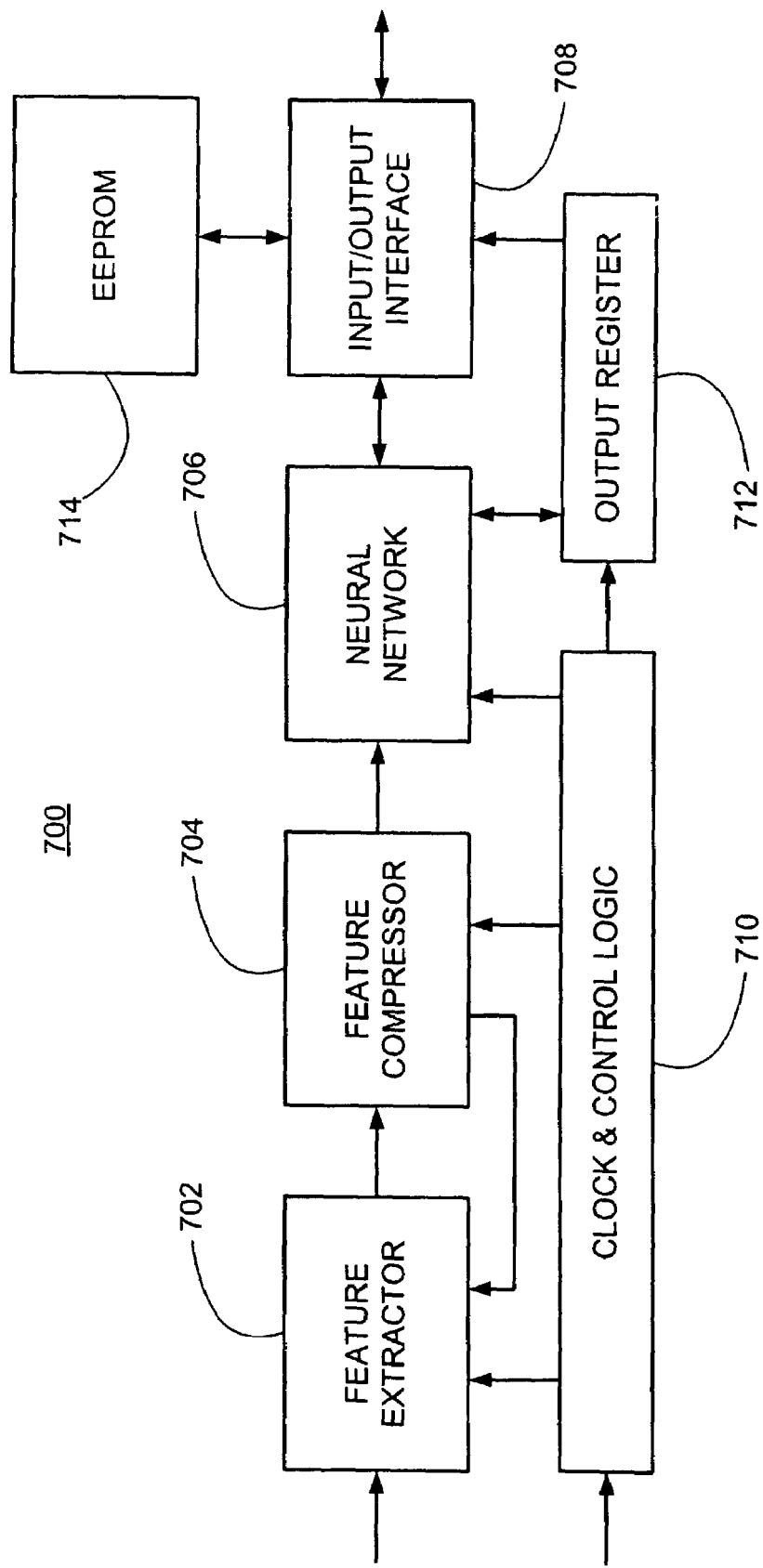
FIG. 7 illustrates the structure of an exemplary handwritten symbol recognition system in which methods and systems consistent with features and principles of the present invention may be implemented.

FIG. 7 illustrates the structure of an exemplary handwritten symbol recognition system 700 for recognizing digital image data arranged in rows and columns in which methods and systems consistent with features and principles of the present invention may be implemented. System 700 may comprise a feature extractor 702, a feature compressor 704, a neural network 706, an input/output (I/O) interface 708, clock and control logic 710, an output register 712, and an EEPROM 714. Feature extractor 702 may be coupled to feature compressor 704. Feature compressor 704 may be coupled to neural network 706. Neural network 706 may comprise "neurons" configured to form a multi-layer perceptron, as described later herein, and may be coupled to I/O interface 708. Clock and control logic 710 may be coupled to feature extractor 702, feature compressor 704, neural network 706, and output register 712. Output register 712 may be coupled to neural network 706 and I/O interface 708. EEPROM 714 may be coupled to I/O interface 708. As one of ordinary skill in the art will appreciate, system 700 may be implemented in an integrated circuit.

Feature extractor 702 may extract information from data reflecting each row of a digital image of handwritten information. Feature extractor 702 may be implemented using a cellular neural network (CNN). The CNN may be configured to be a connected component detection array (CCD), wherein the CCD detects connected components in a digital image.

Figure 8:
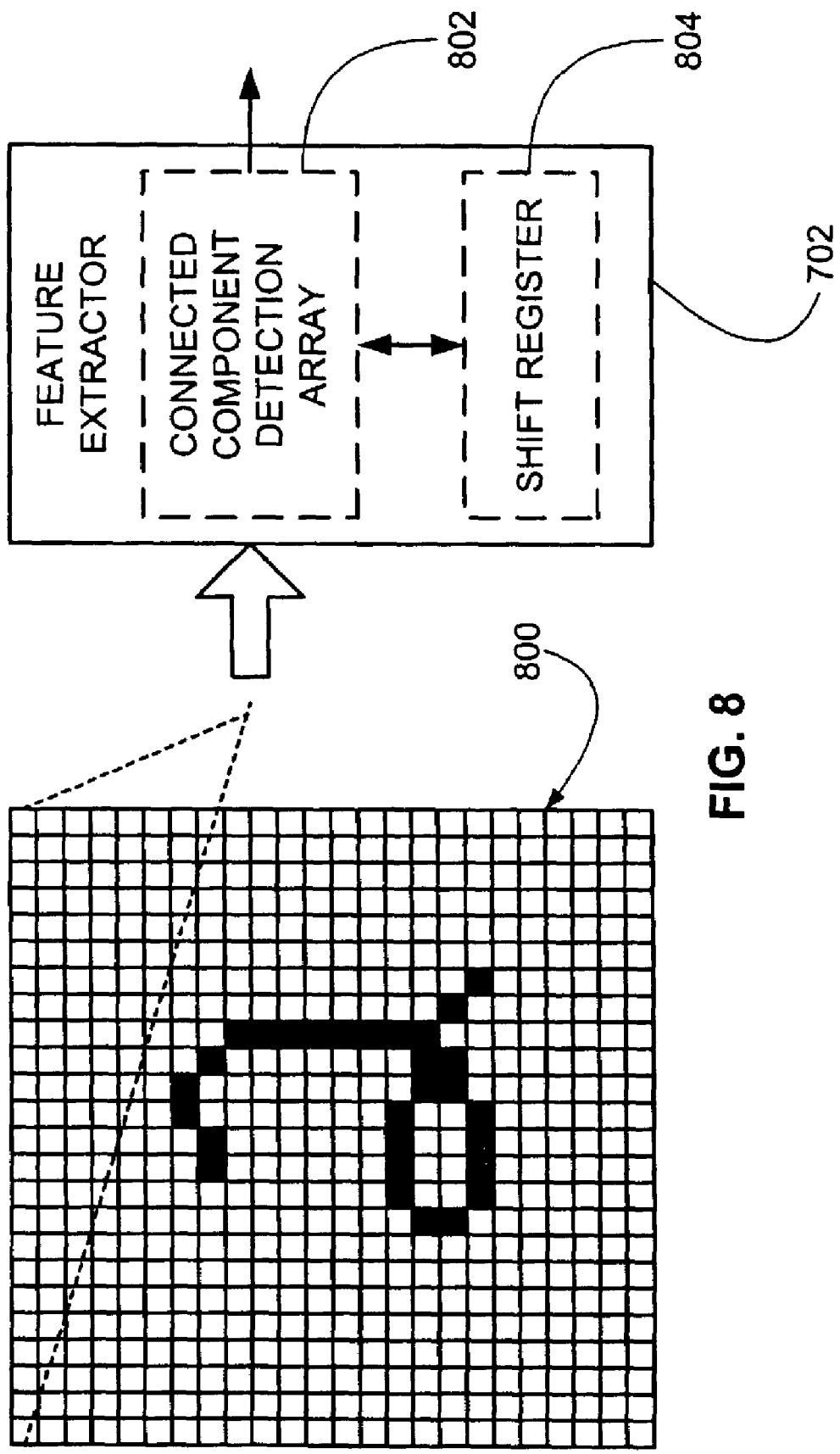
FIG. 8 illustrates an exemplary image of a handwritten symbol consistent with features and principles of the present invention.

By way of a non-limiting example, the digital image may be a 24×24 pixel image 800 of a handwritten symbol (e.g., the number "2") illustrated in FIG. 8. Feature extractor 702 may scan image 800 row-by-row using a 1×24 element CCD array 802. Each element in CCD array 802 may be a cell in a one-dimensional CNN. From each row of 24 pixels, feature extractor 702 may extract four bits of feature information to yield a 24×4 bits table of extracted row feature information as described later herein.

CCD array 802 may consist of a plurality of CCD elements configured in a line. A CCD element may be implemented using an exemplary CMOS circuit 900 illustrated in FIG. 9. As one of ordinary skill in the art will appreciate, circuit 900 may be an approximate realization of model circuit 500 and Equation 1, described above. Circuit 900 may approximately implement [1 2 −1], zero, and zero for template A, template B, and bias current l, respectively. By way of a non-limiting example, resistance R 510 may be realized with an operational transconductance amplifier (OTA) (not shown in FIG. 9) and capacitance C 508 may be realized with a gate capacitor of a MOS transistor 940.

Figure 9:
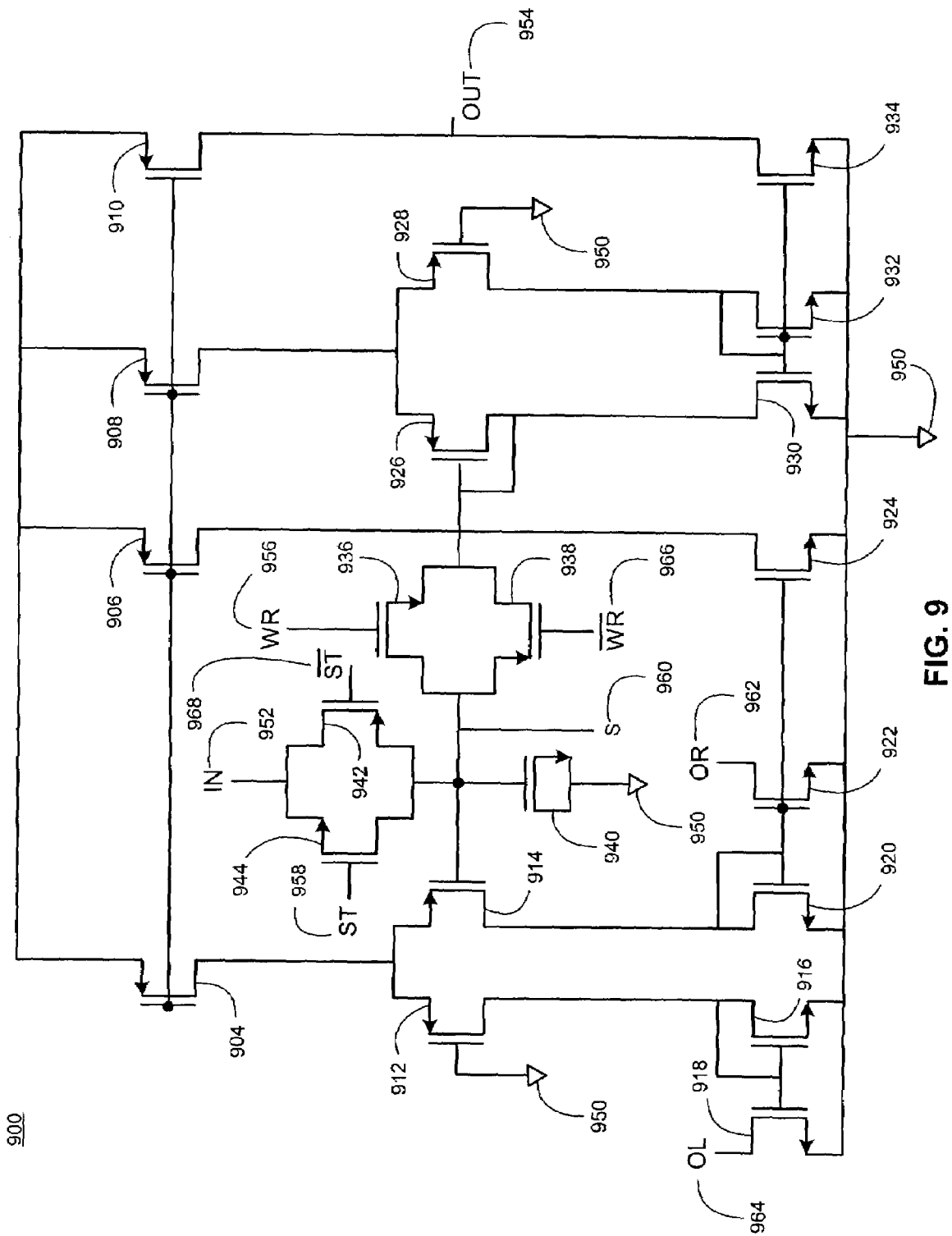
FIG. 9 illustrates an exemplary circuit of a connected component detection element in which methods and systems consistent with features and principles of the present invention may be implemented.

CMOS circuit 900 may include MOS transistors 904–944 configured as shown in FIG. 9. The sources of transistors 904–910 may be coupled together. The gates of transistors 904–910 may be coupled together. The drain of transistor 904 may be coupled to the sources of transistors 912 and 914. The gate of transistor 912 may be coupled to a ground 950. The drain of transistor 912 may be coupled to the gates of transistors 916 and 918. The drain of transistor 916 may be coupled to the gate of transistor 916. The drain of transistor 914 may be coupled the drain of transistor 920. The drain of transistor 920 may be coupled to the gate of transistor 920. The gate of transistor 920 may be coupled to the gate of transistor 922. The gate of transistor 922 may be coupled to the gate of transistor 924. The drain of transistor 924 may be coupled to the drain of transistor 906. The drain of transistor 908 may be coupled to the sources of transistors 926 and 928. The gate of transistor 926 may be coupled to the drain of transistor 926. The drain of transistor 926 may be coupled to the drain of transistor 930. The gate of transistor 930 may be coupled to the gate of transistor 932. The gate of transistor 932 may be coupled to the drain of transistor 932. The drain of transistor 932 may be coupled to the drain of transistor 928. The gate of transistor 928 may be coupled to ground 950. The gate of transistor 932 may be coupled to the gate of transistor 934. The sources of transistors 916–924 and 930–934 may be coupled together and grounded. The drain of transistor 934 may be coupled to the drain of transistor 910. The gate of transistor 926 may be coupled to the source of transistor 936. The source of transistor 936 may be coupled to the drain of transistor 938. The drain of transistor 936 may be coupled to the source of transistor 938. The source of transistor 938 may be coupled to the gate of transistor 940. The source of transistor 940 may be coupled to the drain of transistor 940 and ground 950. The gate of transistor 914 may be coupled to the gate of transistor 940. The source of transistor 942 may be coupled to the gate of transistor 940. The drain of transistor 944 may be coupled to the source of transistor 942. The source of transistor 944 may be coupled to the drain of transistor 942.

Circuit 900 may also include an input line IN 952, an output line OUT 954, a write line WR 956, a set line ST 958, a state voltage line S 960, a right CCD connection line OR 962, a left CCD connection line OL 964, an inverted write line $\overline{WR}$ 966, and an inverted set line $\overline{ST}$ 968. Input line IN 952 may be coupled to the source of transistor 944. Output line OUT 954 may be coupled to the drain of transistor 910. State voltage line S 960 may be coupled to the gate of transistor 914. Right CCD connection line OR 962 may be coupled to the drain of transistor 922. Left CCD connection line OL 964 may be coupled to the drain of transistor 918. Inverted write line $\overline{WR}$ 966 may be coupled to the gate of transistor 938. Inverted set line $\overline{ST}$ 968 may be coupled to the gate of transistor 942.

CCD array 802 may be used to detect the number of connected components in a vector of binary digits. The vector may reflect the color of pixels in a row of image 800 (e.g., a digit "−1" in the vector may reflect a white pixel, and a digit "1" may reflect a black pixel). By way of a non-limiting example, at an initial state, CCD array 802 may "receive" an exemplary 24-bit row of digital information, [−1 −1 −1 −1 −1 −1 1 1 1 1 −1 −1 −1 −1 1 1 1 1 1 1 1 1 1 1]. "Receive" in the current sense may mean the state voltage of each element in CCD array 802 is set to one of two state voltages based on the digital information (e.g., a voltage greater than or equal to zero if a digital bit is one, a voltage less than zero if a digital bit is minus one).

In this example, the information has a first connected component of six negative binary digits, followed by a second connected component of four positive binary digits, followed by a third connected component of four negative binary digits, and ending with a fourth connected component of ten positive binary digits. As one of ordinary skill in the art will appreciate, the final state of CCD array 802 will be [−1 −1 −1 −1 −1 −1 −1 −1 −1 −1 −1 −1 −1 −1 −1 −1 −1 −1 −1 −1 −1 1 −1 1], if CCD array 802 is configured using [1 2 −1] for template A, zero for template B, and zero for bias current l, as previously described. The last, second last, third last, and fourth last digit at the final state may represent the fourth, third, second, and first connected component at the initial state, respectively. The last, second last, third last, and fourth last digit at the final state may be the least significant bit (LSB), second LSB, third LSB, and fourth LSB of a row in a 24×4 bits table of extracted row feature information, respectively.

Figure 10:
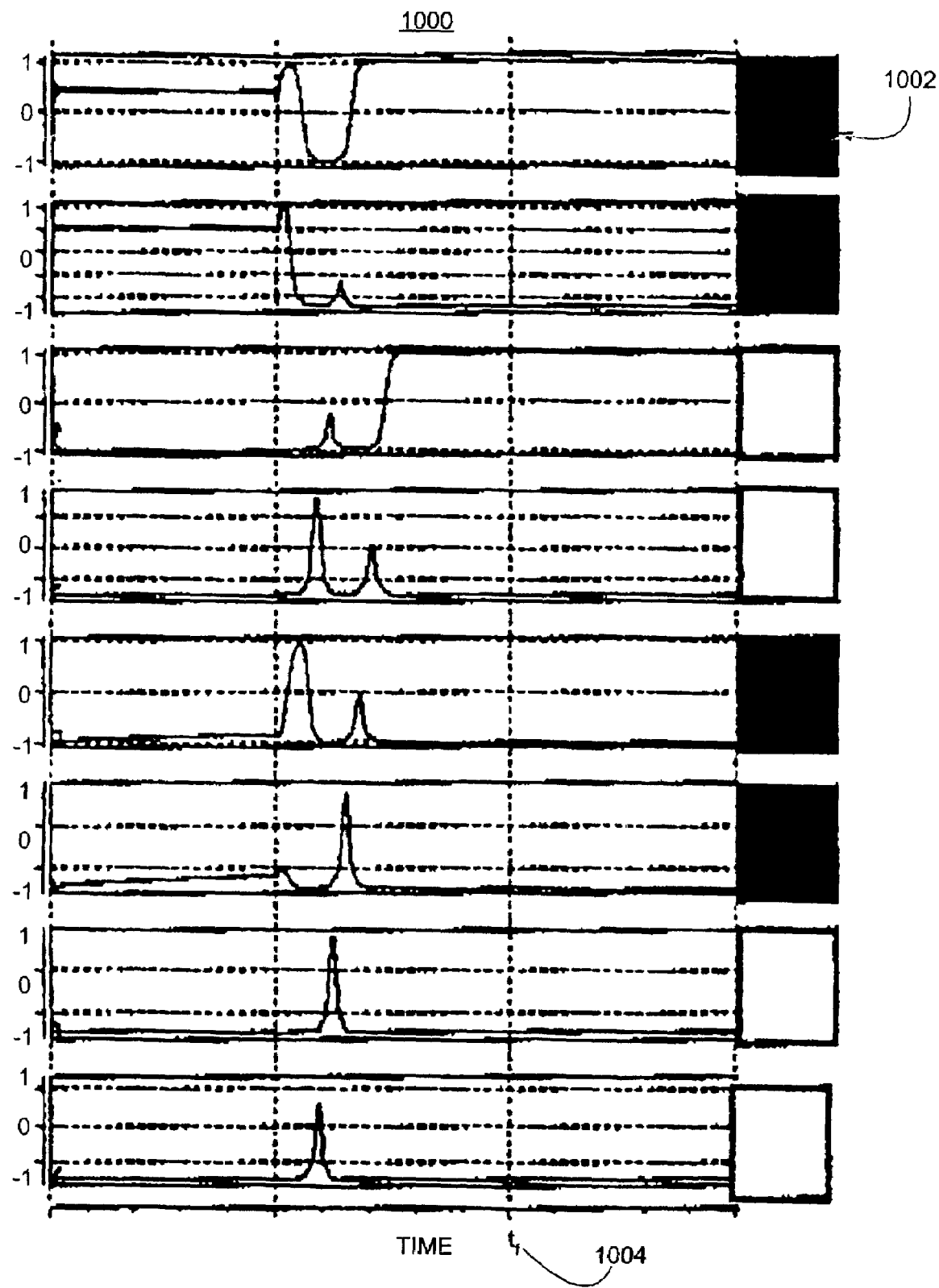
FIG. 10 illustrates results of a HSPICE simulation for an exemplary CCD array in which methods and systems consistent with features and principles of the present invention may be implemented.

FIG. 10 illustrates results of a HSPICE simulation 1000 for ten CCD elements implemented using circuit 900 in an exemplary 1×10 element CCD array. Boxes 1002 on the right of each graph in simulation 1000 indicates an initial state of each CCD element (black box for +1 and white box for −1). As shown in FIG. 10, from the bottom graph to the top graph, the initial state of the CCD elements in the CDD array is [−1 −1 1 1 −1 −1 1 1]. The initial state has four connected components with negative, positive, negative, and positive binary bits, respectively. Therefore, the final state should be [−1 −1 −1 −1 −1 1 −1 1] and, as shown in the FIG. 10, the final state, after time $t_f$ 1004, of the CCD elements in simulation 1000 agrees.

After extracting the 24×4 bits table of row feature information using feature extractor 702, feature compressor 704 may compress the extracted row feature information by removing a portion, for example, the first and fourth bit of each row in the 24×4 bits table. This is because the number of strokes in a handwritten symbol may be relatively small and there are usually no more than three bits of feature information in a row. Rows that have more than three bits of feature information are usually generated by noise or very distorted strokes, so the fourth bit of each row may be discarded. Further, the first bit of each row's feature information always exist for a normalized image because of the relativity of the feature information. Since it may not provide much help in classifying the handwritten symbol, the first bit may also be discarded. Thus, 24×2 bits of row feature information remain and the first step of feature compression is finished. Alternatively, this first step of feature compression may implicitly be performed by feature extractor 702. Feature extractor 702 may simply not extract the first and fourth bit of feature information of each row.

Figure 11:
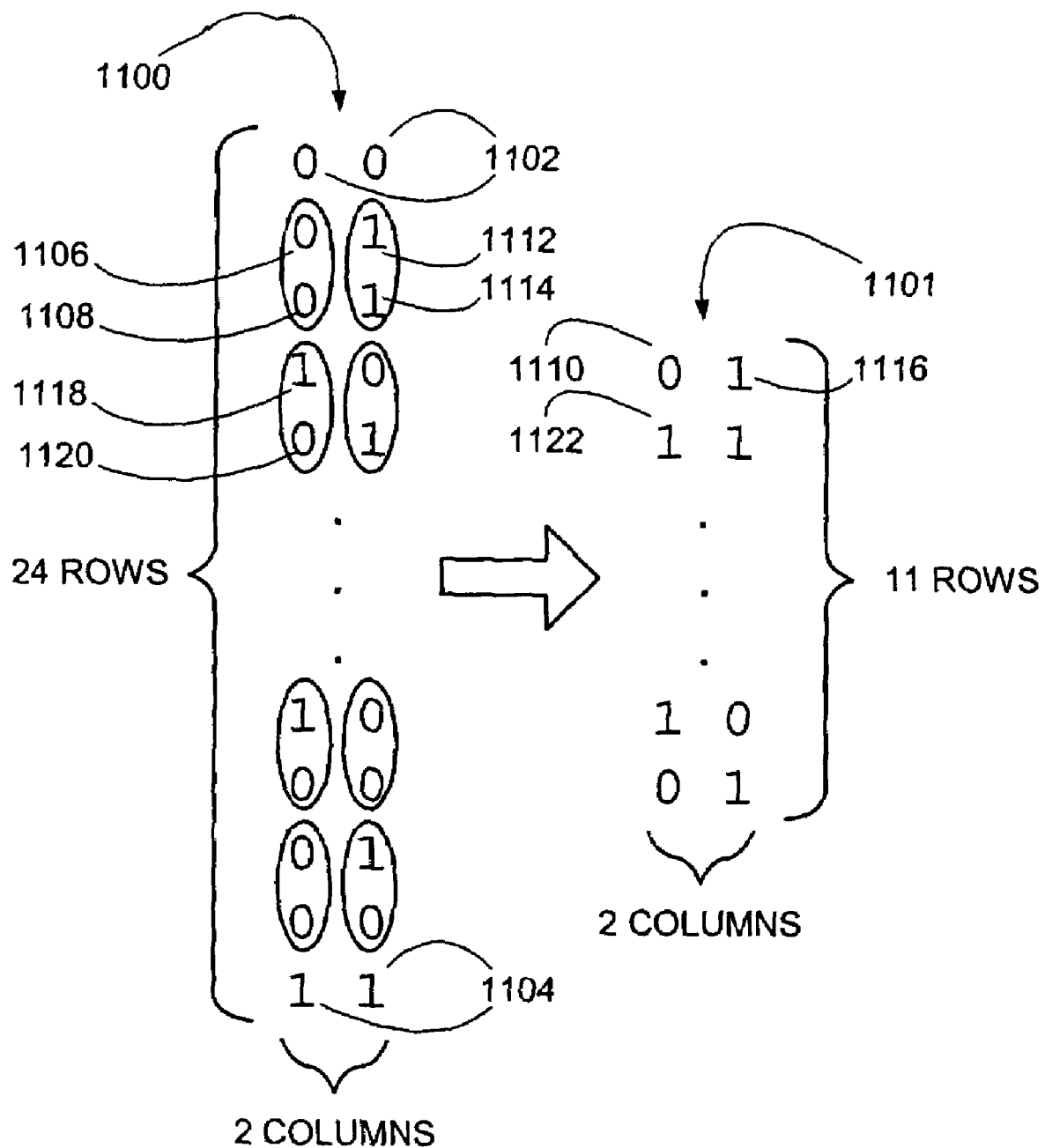
FIG. 11 illustrates an exemplary step of feature compression consistent with features and principles of the present invention.

During a second step of compression, feature compressor 704 may logically OR every two bits of nearest non-overlapping neighbors in each column of 24×2 bits 1100 of row feature information except for a first bit 1102 and a last bit 1104 in each column, as illustrated in FIG. 11. By way of a non-limiting example, feature compressor 704 may OR a second bit 1106 and a third bit 1108 of the first column in 24×2 bits 1100 of row feature information to produce a first bit 1110 of the first column in an 11×2 bits 1101 of compressed row feature information. Feature compressor 704 may OR a second bit 1112 and a third bit 1114 of the second column in 24×2 bits 1100 of row feature information to produce a first bit 1116 of the second column in 11×2 bits 1101 of compressed row feature information. Feature compressor 704 may OR a fourth bit 1118 and a fifth bit 1120 of the first column in 24×2 bits 1100 of row feature information to produce a second bit 1122 of the first column in 11×2 bits 1101 of compressed row feature information. Feature compressor 704 may similarly OR the remaining bits in 24×2 bits 1100 of row feature information to produce the remaining bits in 11×2 bits 1101 of compressed row feature information.

During extraction of feature information from each row of digital image 800, feature extractor 702 may also extract feature information reflecting a diagonal of image 800 by extracting one bit of feature information from a bit in each row. By way of a non-limiting example, at the first row of image 800, feature extractor 702 may extract one bit of feature information from the first bit in the first row. At the second row of image 800, feature extractor 702 may extract one bit of feature information from the second bit in the second row. At the $n^{th}$ row of image 800, feature extractor 702 may extract one bit of feature information from the $n^{th}$ bit in the $n^{th}$ row. Thus, 24×1 bits of diagonal feature information from the diagonal of image 800 may be obtained after scanning all the rows. As one of ordinary skill in the art will appreciate, a shift register 804 (FIG. 8) may be used to extract and store the 24×1 bits of diagonal feature information.

The 24×1 bits of diagonal feature information may be sent back to feature extractor 702. Feature extractor 702 may extract four bits of twice-processed diagonal feature information from the 24×1 bits of diagonal feature information using CCD array 802 in a similar manner as it did for a 1×24 pixel row in image 800 of FIG. 8, as described above. However, in this case, feature extractor 702 operates on a column of 24×1 bits instead of a row of 1×24 bits. The four bits of twice-processed diagonal feature information may be compressed by discarding the first and last bits of the four bits. This yields two bits of twice-processed, compressed diagonal feature information.

24×2 bits 1100 of row feature information may also be sent back to feature extractor 702. Feature extractor 702 may extract four bits of twice-processed row feature information from each column of 24×2 bits 1100. The four bits of twice-processed row feature information of both columns may be compressed by discarding the first bit in the four bits of each column. This yields three bits of twice-processed, compressed row feature information from each column for a total of six bits of twice-processed, compressed row feature information.

11×2 bits 1101 of compressed row feature information, two bits of twice-processed, compressed diagonal feature information, and six bits of twice-processed, compressed row feature information may form thirty bits of extracted, compressed row feature information. As one of ordinary skill in the art will appreciate, feature extractor 702 and feature compressor 704 may similarly generate thirty bits of extracted, compressed column feature information from 24×1 pixels columns of digital image 800. Two bits of twice-processed, compressed diagonal feature information in the thirty bits of extracted, compressed column feature information may be generated using the same diagonal (or a different diagonal) as the diagonal used to generate the two bits of twice-processed, compressed diagonal feature information in the thirty bits of extracted, compressed row feature information.

Neural network 706 may receive the total sixty bits of extracted, compressed row and column feature information as sensory information in a sensory layer of neural network 706. Neural network 706 may use the total sixty bits to recognize the handwritten symbol in digital image 800 by providing symbol classification results for digital image 800 as described below.

Figure 12:
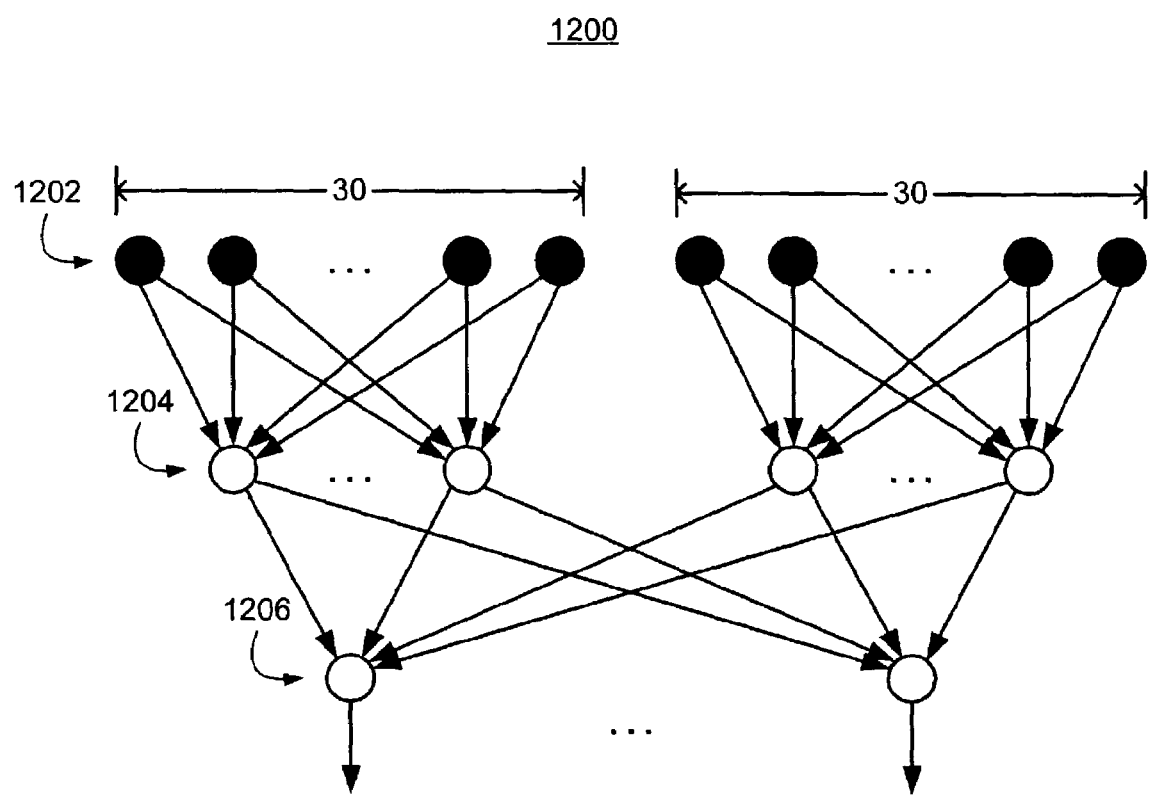
FIG. 12 illustrates the structure of an exemplary multi-layer perceptron in which methods and systems consistent with features and principles of the present invention may be implemented.

Neural network 706 may be a multi-layer perceptron (MLP) 1200, as illustrated in FIG. 12. MLP 1200 may comprise a sensory layer 1202, an association layer 1204, and an output layer 1206. Each layer 1202–1206 may include neurons, which may be fundamental building blocks of MLP 1200. Each neuron may accept inputs from other neurons via connections and may combine the inputs (e.g., summing, substracting, etc.) to generate outputs. Each input may be multiplied by a connection weight.

The amount of gain applied to signals traveling between any connected neurons in MLP 1200 may be quantized and stored as "weights". The weights may be stored as binary digits representing a scalar. The numeric value of the scalar may reflect the amount of amplification or dampening to apply to the signals. The weights may be trained using a Back-Propagation (BP) learning algorithm, deviation BP learning algorithm, or any other algorithm compatible with the present invention. The weights may be learned in off-chip mode and the training results may be stored in an off-chip EEPROM 714 (FIG. 7) after quantization. The weights may also be stored in EPROM, RAM, and/or any other storage media. These weights may be recalled via I/O interface 708 and used by the neurons to classify a handwritten symbol. The weights may be updated off-line when necessary.

Sensory layer 1202 may be equally divided into two groups of thirty sensory neurons each. As one of ordinary skill in the art will appreciate, each group of thirty sensory neurons may be fully connected to ten of twenty associative neurons in association layer 1204. Each bit of the total sixty bits of extracted, compressed row and column feature information may be a sensory neuron, whereby sensory information may be sent to the connected associative neurons. The twenty associative neurons may be fully connected with ten output neurons in output layer 1206. The output from the output neurons may be the symbol classification results.

For example, neural network 706 may receive, via sensory layer 1202, feature information extracted and compressed from digital image 800. As described above, the feature information may be in the form of binary bits, wherein a zero bit may be represented as a negative voltage signal and a one bit may be represented as a zero or positive voltage signal. Neural network 706 may process the signals by applying weights and adding/subtracting the signals with each other at association layer 1204 and output layer 1206. The weights may amplify, dampen, or pass-through signals traveling between the connected neurons. The resulting combined signals (i.e., the output signal) from the ten output neurons in output layer 1206 may be a certain combination of signals that identifies the handwritten symbol in digital image 800 as a certain symbol corresponding to the combination of signals.

By way of a non-limiting example to illustrate the process of classification, the output signals from the ten output neurons in output layer 1206 may be, respectively, a positive voltage, a negative voltage, a positive voltage, a positive voltage, a negative voltage, a positive voltage, a positive voltage, a positive voltage, a negative voltage, and a positive voltage. In this example, neural network 706 outputs this particular combination of signals, whenever feature extractor 702 and feature compressor 704 supply input signals to neural network 706 which were derived from row-and-column data of digital image 800 representing the character "2". Neural network 706 generates other unique combinations of signals, whenever digital image 800 contains other handwritten characters.

Figure 13:
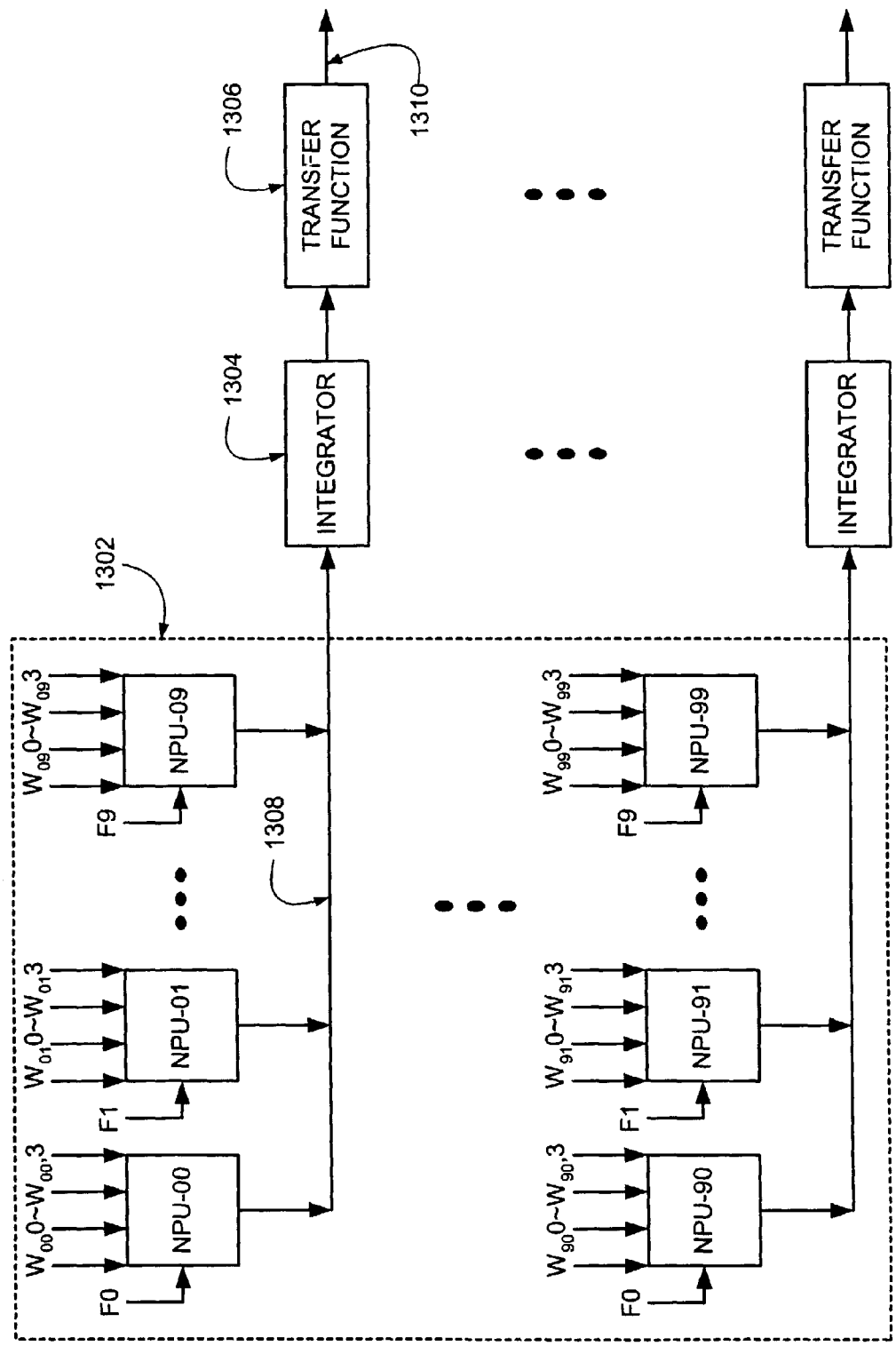
FIG. 13 illustrates the system diagram of an exemplary multi-layer perceptron in which methods and systems consistent with features and principles of the present invention may be implemented.

Referring now to FIG. 13, although the structure of MLP 1200 forming neural network 706 (FIG. 7) may include sixty sensory neurons, twenty associative neurons, and ten output neurons, the actual implementation of MLP 1200 may consist of a 10×10 neural processing unit (NPU) array 1302, ten current integrators 1304, and ten transfer function blocks 1306. The outputs of each row of NPUs in NPU array 1302 may be coupled to their respective current integrators 1304. Each current integrator 1304 may be coupled to its respective transfer function block 1306.

NPU array 1302 may receive sixty bits of extracted, compressed row and column feature information in a pipeline mode. In pipeline mode, every ten bits F0–F9 of the sixty bits may be received by NPU array 1302 one clock cycle at a time using clock and control logic 710. As one of ordinary skill in the art will appreciate, clock and control logic 710 may be configured to coordinate the extraction, compression, and sending of feature information to NPU array 1302 in a pipeline mode of ten bits of extracted, compressed row and column feature information per clock cycle.

Each NPU in NPU array 1302 may weight every ten bits F0–F9 according to the NPU's respective weight $W_{00}$–$W_{99}$. Each weight may comprise four bits. For example, weight $W_{00}$ for NPU-00 may comprise bits $W_{00}0$, $W_{00}1$, $W_{00}2$, and $W_{00}3$ and weight $W_{13}$ for NPU-13 may comprise bits $W_{13}0$, $W_{13}1$, $W_{13}2$, and $W_{13}3$. The weights $W_{00}$–$W_{99}$ applied to any ten bits F0–F9 in one clock cycle may be the same or different from the weights $W_{00}$–$W_{99}$ applied to another ten bits F0–F9 in another clock cycle. The weights $W_{00}$–$W_{99}$ may be applied to any ten bits F0–F9 via multiplication and/or addition.

The weights $W_{00}$–$W_{99}$ for NPU array 1302 may be changed after NPU array 1302 finishes a computation for a cycle. The refreshed weights may come from off-chip EEPROM or any other storage media as previously described. The refreshed weights may come through I/O interface 708 in a number of periods of a sub-clock.

Several thousand bytes of EEPROM locations may be fabricated on a chip. These EEPROM locations may be divided into several blocks and each may have 10×10×4 bits. Each block may provide the weights $W_{00}$–$W_{99}$ for a given clock cycle. Switches (not shown) and a block selecting signal (not shown) may be used to change the weights $W_{00}$–$W_{99}$ in one cycle by switching the source of weights $W_{00}$–$W_{99}$ from one block to another block.

NPU array 1302 may output ten partial-sum currents 1308 to be accumulated by their respective current integrators 1304. Partial sum currents 1308 may be generated by connecting the output terminals of each row of ten NPUs in NPU array 1302. As one of ordinary skill in the art will appreciate, current integrators 1304 may be single-ended switched current integrators with a shared regulated gate cascade structure or any other type of current integrator compatible with the present invention.

After NPU array 1302 processes the first thirty bits of the sixty bits in three clock cycles and current integrators 1304 accumulate their respective partial-sum currents 1308, transfer function blocks 1306 may apply a non-linear (or linear) transfer function to the accumulated partial-sum currents from current integrators 1304 to produce ten intermediate results at output 1310 of transfer function blocks 1306, respectively. The transfer function will be described in more detail with respect to FIG. 15. These intermediate results may be stored in output register 712 (FIG. 7).

Similarly, NPU array 1302 of neural network 706 may process the second half (thirty bits) of the sixty bits in another three clock cycles. Current integrators 1304 may again accumulate respective partial-sum currents 1308 and after the three clock cycles, transfer function blocks 1306 may again apply a transfer function to respective accumulated partial-sum currents 1308 from current integrators 1304 to produce a second set of ten intermediate results at output 1310 of transfer function blocks 1306. The second set of intermediate results may be stored with the first set of intermediate results in output register 712.

The first thirty bits of the sixty bits may be the thirty bits of extracted, compressed row feature information. The second half of the sixty bits may be the thirty bits of extracted, compressed column feature information. Each bit in the two sets (twenty bits total) of intermediate results may correspond to the output of the twenty association neurons in association layer 1204.

NPU array 1302 (FIG. 13) may process the intermediate results stored in output register 712 to produce the outputs of output layer 1206 (FIG. 12). For example, NPU array 1302 may recall and process the first set of ten intermediate results to produce partial-sum currents 1308 in one clock cycle. NPU array 1302 may recall and process the second set of ten intermediate results to produce partial-sum currents 1308 in a second clock cycle. Current integrators 1304 may accumulate partial-sum currents 1308 from the first and second set of intermediate results. Transfer function blocks 1306 may apply a transfer function to the accumulated currents of the intermediate results, from current integrators 1304, to produce classification results (at the output of transfer function blocks 1306), which may be used to recognize the handwritten symbol in digital image 800 as described previously. I/O interface 708 may output the classification results.

Figure 14:
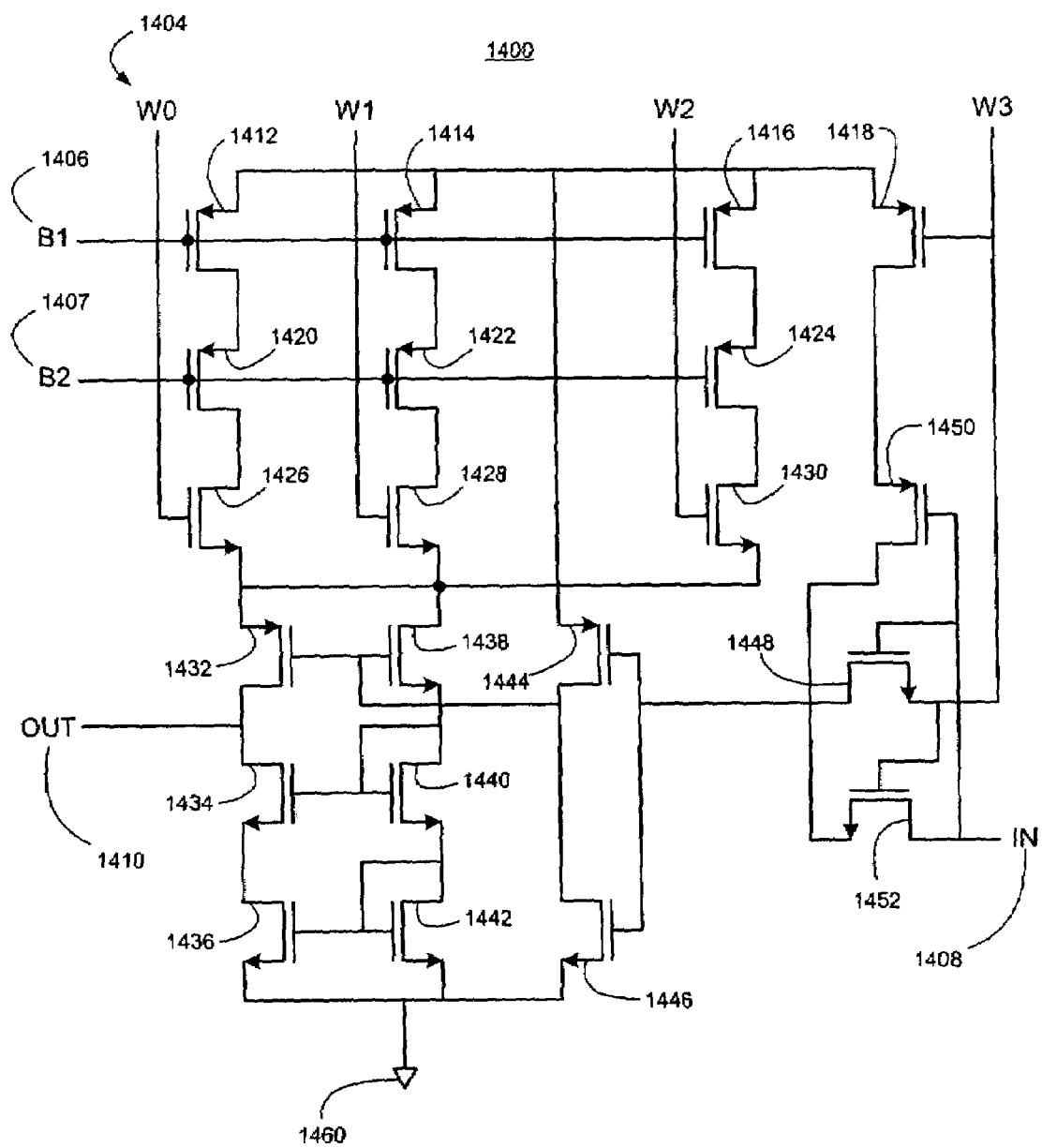
FIG. 14 illustrates an exemplary circuit of a neural processing unit in which methods and systems consistent with features and principles of the present invention may be implemented.

FIG. 14 illustrates an exemplary circuit 1400 for NPU-00 to NPU-99 in NPU array 1302 in which methods and systems consistent with features and principles of the present invention may be implemented. Circuit 1400 may include four-bit weight lines W0~W3 1404, bias voltage lines B1 1406 and B2 1407, a NPU input line 1408, and a NPU output line 1410. Circuit 1400 may be used to multiply a weight reflected at four-bit weight lines W0~W3 1404 with one bit of feature information reflected at NPU input line 1408. The value and sign of the weight may be controlled by a digital signal, where W3 may be a sign bit and W0, W1, and W2 may be value bits. As one of ordinary skill in the art will appreciate, a ratio of current mirrors in circuit 1400 controlled by the value bits may be 1:2:4.

Circuit 1400 may include MOS transistors 1412–1452 configured as shown in FIG. 14. The sources of transistors 1412–1418 may be coupled together. The gates of transistors 1412–1416 may be coupled with bias voltage B1 1406. The gates of transistors 1420–1424 may be coupled with bias voltage B2 1407. The sources of transistors 1426–1430 may be coupled together. The drain of transistor 1412 may be coupled to the source of transistor 1420. The drain of transistor 1420 may be coupled to the drain of transistor 1426. The gate of transistor 1426 may be coupled to weight line W0. The drain of transistor 1414 may be coupled to the source of transistor 1422. The drain of transistor 1422 may be coupled to the drain of transistor 1428. The gate of transistor 1428 may be coupled to the weight line W1. The drain of transistor 1416 may be coupled to the source of transistor 1424. The drain of transistor 1424 may be coupled to the drain of transistor 1430. The gate of transistor 1430 may be coupled to weight line W2. The source of transistor 1432 may be coupled to the source of transistor 1426. The drain of transistor 1432 may be coupled to the drain of transistor 1434 and NPU output line 1410. The source of transistor 1434 may be coupled to the drain of transistor 1436. The drain of transistor 1438 may be coupled to the source of transistor 1432. The gates of transistors 1432 and 1438 may be coupled together. The gates of transistors 1434 and 1440 may be coupled together. The gates of transistors 1436 and 1442 may be coupled together. The source of transistor 1438 may be coupled to the drain of transistor 1440. The source of transistor 1440 may be coupled to the drain of transistor 1442. The gate of transistor 1440 may be coupled to the drain of transistor 1440. The gate of transistor 1442 may be coupled to the drain of transistor 1442. The source of transistor 1444 may be coupled to the sources of transistors 1412–1418. The drain of transistor 1444 may be coupled to the drain of transistor 1446 and the gate of transistor 1438. The gates of transistors 1444 and 1446 may be coupled together. The sources of transistors 1436, 1442, and 1446 may be coupled to a ground 1460. The drain of transistor 1448 may be coupled to the gate of transistor 1444. The gate of transistor 1448 may be coupled to the gate of transistor 1450 and the drain of transistor 1452. The source of transistor 1448 may be coupled to the gates of transistors 1418 and 1452. The drain of transistor 1450 may be coupled to the source of transistor 1452. The source of transistor 1450 may be coupled to the drain of transistor 1418. The drain of transistor 1452 may be coupled to NPU input line 1408. The gate of transistor 1418 may be coupled to the weight line W3.

Figure 15:
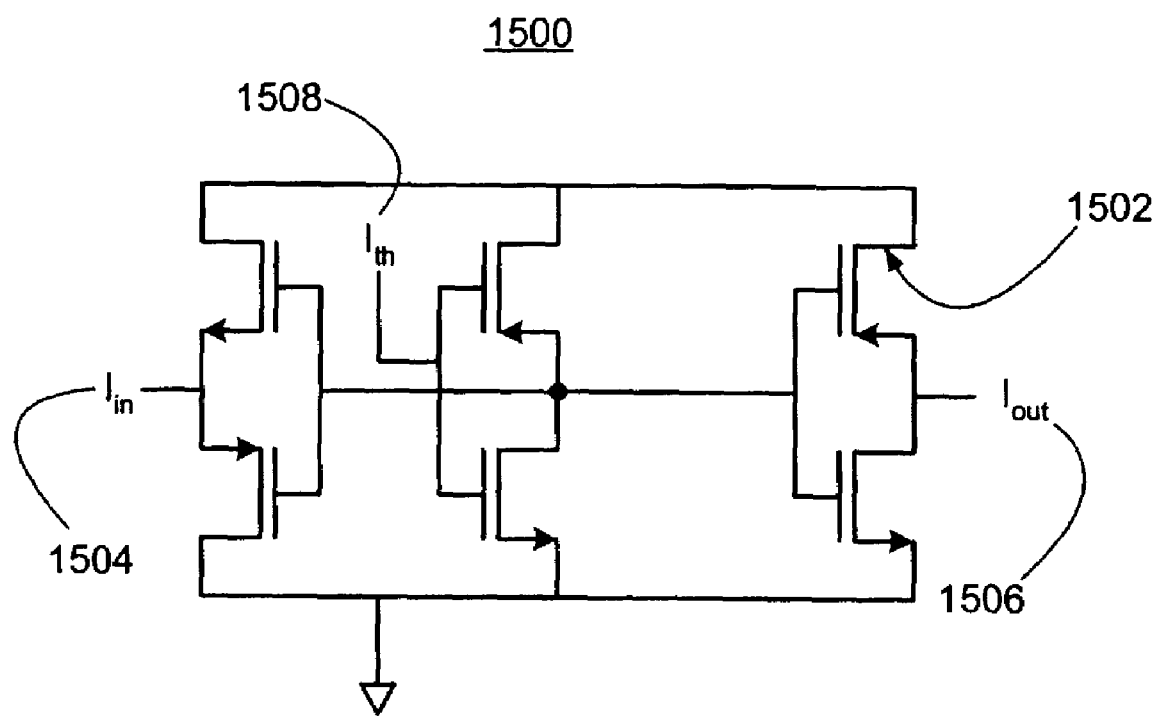
FIG. 15 illustrates an exemplary circuit of a current comparator in which methods and systems consistent with features and principles of the present invention may be implemented.

FIG. 15 illustrates an exemplary circuit 1500 of a current comparator in which methods and systems consistent with features and principles of the present invention may implement transfer function blocks 1306. Circuit 1500 may comprise MOS transistors 1502 configured as shown in FIG. 15. Circuit 1500 may also include a transfer function input current line $l_{in}$ 1504, a transfer function output current line $l_{iout}$ 1506, and a threshold current line $l_{th}$ 1508. The transfer function $T_f(.)$ of circuit 1500 may be approximated with $$T_f(I_{in}) = \frac{K}{1 + \exp(-G(I_{in} - I_{th}))}, \tag{3}$$

where the parameters K, G, and $l_{th}$ may be acquired using a fitting method. The parameters may be adjusted to fit a desired transfer characteristic. As one of ordinary skill in the art will appreciate, the fitting method may use empirically collected data from the current comparator transfer characteristic to determine/adjust the parameters.

The transfer function of circuit 1500 may be non-linear and approximated by Equation 3. However, alternative circuits with linear and/or other approximations compatible with the present invention may be used.

In the foregoing description, NPU array 1302 includes 10×10 NPU cells to implement MLP 1200 in pipeline mode. However, as one of ordinary in the art will appreciate, other configurations of an NPU array may be used to implement a given MLP. A NPU array is not limited to a 10×10 configuration and a given MLP is not limited to three layers. Other MLPs suitable for handwritten symbol recognition may be used and other configurations of an NPU array may be used to implement other MLPs.

By way of a non-limiting example, an exemplary MLP may comprise sixty-four sensory neurons fully connected to sixteen associative neurons. The associative neurons may be fully connected to eight output neurons. Consistent with features and principles of the present invention described herein, an 8×8 NPU array may generate partial-sum currents in sixteen clock cycles. The partial-sum currents may be accumulated and transformed using eight integrators and eight transfer function blocks, respectively. The output of the transfer function blocks may be stored in an eight bits register. The stored output may be recalled and processed by the 8×8 NPU array to generate handwritten symbol classification results.

Also in the foregoing description, various features are grouped together in various embodiments for purposes of streamlining the disclosure. This method of disclosure is not to be interpreted as reflecting an intention that the claimed invention requires more features than may be expressly recited in each claim. Rather, as the following claims reflect, inventive aspects may lie in less than all features of a single foregoing disclosed embodiment. Thus, the following claims are hereby incorporated into this description, with each claim standing on its own as a separate embodiment of

What is claimed is:

1. A system for recognizing digital image data arranged in rows and columns, comprising:
   a feature extractor for extracting feature information from data representing the rows and columns of the digital image data, wherein the extracted feature information of a row comprises a plurality of row bits and the extracted feature information of a column comprises a plurality of column bits;
   a feature compressor for compressing the extracted feature information, whereby a portion of the row bits from the extracted feature information of the rows is removed and a portion of the column bits from the extracted feature information of the columns is removed; and
   a neural network for classifying the digital image data from the compressed, extracted feature information, wherein the feature extractor includes a shift register to extract feature information of a diagonal of the digital image data.

2. A system for recognizing digital image data arranged in rows and columns, comprising:
- a feature extractor for extracting feature information from data representing the rows and columns of the digital image data, wherein the extracted feature information of a row comprises a plurality of row bits and the extracted feature information of a column comprises a plurality of column bits;
- a feature compressor for compressing the extracted feature information, whereby a portion of the row bits from the extracted feature information of the rows is removed and a portion of the column bits from the extracted feature information of the columns is removed; and
- a neural network for classifying the digital image data from the compressed, extracted feature information.

wherein the feature compressor logically ORs remaining row bits between neighboring rows and logically ORs remaining column bits between neighboring columns.

3. The system of claim 1 or 2, wherein the neural network includes a multi-layer perceptron comprising a sensory layer, association layer, and response layer, and wherein the sensory layer receives the compressed feature information.

4. The system of claim 3, wherein the compressed feature information is received in pipeline mode.

5. The system of claim 3, wherein the sensory layer comprises two groups of sensory neurons, the association layer comprises two groups of association neurons, the first group of sensory neurons is connected with the second group of association neurons, and the second group of sensory neurons is connected with the second group of association neurons.

6. The system of claim 5, wherein the response layer comprises response neurons and the two groups of association neurons are connected to the response neurons.

7. The system of claim 3, wherein the multi-layer perceptron is trained using a back propagation learning algorithm.

8. The system of claim 1 or 2, wherein the feature extractor includes connected component detection array to extract the feature information of each row and each column of the digital image data.

9. The system of claim 2, wherein the feature extractor extracts feature information reflecting at least one diagonal of the digital image data.

10. The system of claim 1 or 9, wherein the feature compressor combines the extracted feature information of the diagonal and each row, sends the combined feature information of the diagonal and each row to the feature extractor to extract additional row feature information, combines the extracted feature information of the diagonal and each column, and sends the combined feature information of the diagonal and each column to the feature extractor to extract additional column feature information.

11. The system of claim 10, wherein the feature compressor compresses the additional row feature information and the additional column feature information to produce the compressed, extracted feature information.

* * * * *